(12) United States Patent
Nagara et al.

(10) Patent No.: US 9,961,390 B2
(45) Date of Patent: *May 1, 2018

(54) IMAGE PROCESSING DEVICE, IMAGE REPRODUCTION DEVICE, AND IMAGE REPRODUCTION SYSTEM

(71) Applicant: Sony Corporation, Tokyo (JP)

(72) Inventors: Toru Nagara, Tokyo (JP); Tomoya Yamaura, Tokyo (JP)

(73) Assignee: Sony Corporation (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/451,730

(22) Filed: Mar. 7, 2017

(65) Prior Publication Data

US 2017/0180779 A1 Jun. 22, 2017

Related U.S. Application Data

(63) Continuation of application No. 13/308,796, filed on Dec. 1, 2011, now Pat. No. 9,641,886.

(30) Foreign Application Priority Data

Dec. 10, 2010 (JP) ................................. 2010-275976

(51) Int. Cl.
*H04N 21/43* (2011.01)
*H04N 21/41* (2011.01)
(Continued)

(52) U.S. Cl.
CPC ....... *H04N 21/4305* (2013.01); *H04N 21/242* (2013.01); *H04N 21/4122* (2013.01);
(Continued)

(58) Field of Classification Search
CPC ..................................................... H04N 21/00
See application file for complete search history.

(56) References Cited

U.S. PATENT DOCUMENTS 6,751,401 B1 * 6/2004 Arai ....................... H04H 20/28
348/460
8,457,444 B2 6/2013 Ohkawa et al.
(Continued)

FOREIGN PATENT DOCUMENTS

CN 1224301 A 7/1999
EP 1233622 A2 8/2002
(Continued)

OTHER PUBLICATIONS

European Search Report Application No. 11191527, dated May 9, 2012.
(Continued)

*Primary Examiner* — Andrew Lai
*Assistant Examiner* — Sumitra Ganguly
(74) *Attorney, Agent, or Firm* — Lerner, David, Littenberg, Krumholz & Mentlik, LLP

(57) ABSTRACT

According to an illustrative embodiment, a data transmission device is provided. The device includes a communication unit for transmitting data to a receiver and transmitting data having a changed characteristic to the receiver, wherein when transmitting the data the device transmits timing information to the receiver indicating a time that the device will begin transmitting the data having a changed characteristic.

20 Claims, 11 Drawing Sheets

(51) Int. Cl.
*H04N 21/414* (2011.01)
*H04N 21/4363* (2011.01)
*H04N 21/4402* (2011.01)
*H04N 21/242* (2011.01)
*H04N 21/2343* (2011.01)

(52) U.S. Cl.
CPC . *H04N 21/41407* (2013.01); *H04N 21/43637* (2013.01); *H04N 21/440263* (2013.01); *H04N 21/234363* (2013.01)

(56) References Cited

U.S. PATENT DOCUMENTS

| | | | |
|---|---|---|---|
| 9,641,886 B2* | 5/2017 | Nagara | H04N 21/4122 |
| 2002/0080399 A1 | 6/2002 | Nakagawa | |
| 2005/0201537 A1 | 9/2005 | Honda | |
| 2005/0207487 A1 | 9/2005 | Monroe | |
| 2006/0095943 A1 | 5/2006 | Demircin et al. | |
| 2007/0032198 A1 | 2/2007 | Sakamoto | |
| 2007/0040818 A1 | 2/2007 | Aoyanagi et al. | |
| 2009/0043692 A1 | 2/2009 | Pippuri et al. | |
| 2009/0282163 A1 | 11/2009 | Washiro | |
| 2010/0153988 A1 | 6/2010 | Takai et al. | |
| 2010/0188566 A1 | 7/2010 | Oku | |
| 2010/0218232 A1* | 8/2010 | Rodriguez | H04N 7/17318 725/118 |
| 2010/0271995 A1* | 10/2010 | Seok | H04W 52/0216 370/311 |
| 2010/0328459 A1 | 12/2010 | Jang | |

FOREIGN PATENT DOCUMENTS

| | | |
|---|---|---|
| EP | 2029126 A1 | 3/2009 |
| EP | 2129126 A1 | 12/2009 |
| JP | 2004336730 A | 11/2004 |
| JP | 2005006114 A | 1/2005 |
| JP | 2005348015 A | 12/2005 |
| JP | 2006217242 A | 8/2006 |
| JP | 2008244572 A | 10/2008 |
| JP | 2009135888 A | 6/2009 |
| JP | 2009-272874 A | 11/2009 |
| JP | 2009290691 A | 12/2009 |
| JP | 2010074360 A | 4/2010 |
| JP | 2010103718 A | 5/2010 |
| WO | 2008108379 A1 | 9/2008 |

OTHER PUBLICATIONS

Japanese Office Action for Application No. 2010275976, dated Nov. 4, 2014.
Extended European Search Report for EP Application No. 14187677.1, dated Dec. 18, 2014.
Baker, et al., Downlink Physical Data and Control Channels, LTE—The UMTS Long Term Evolution: From Theory to Practice, pp. 181-206, 2009.
Wiegand, et al. Overview of the H. 264-AVC Video Coding Standard, IEEE, pp. 560-576, 2003.
Japanese Office Action for JP Application No. 2010275976, dated Apr. 14, 2015.
Japanese Office Action for 2015014264 dated Dec. 22, 2015.
Japanese office action for 201110394661.3 dated Dec. 25, 2015.
Chinese Office Action for Application No. 201110394661.3 dated Sep. 8, 2016.
Hartung et al; MBMS—IP Multicast/Broadcast in 3G Networks; Hindawi Publishing Corporation; International Journal of Digital Multimedia Broadcasting; vol. 2009, Article ID 597848, Jan. 2009 pp. 1-25.
Summons to Attend Oral Proceedings Pursuant to Rule 115 (1) in connection with European Application No. 14187677.1, dated Apr. 19, 2017, pp. 1-7.
Japanese Office Action for Application No. 2016163654, dated Aug. 1, 2017.
Nagata et al., Trend of Standardization of Wireless LAN in IEEE. 802.11 and Wi-Fi Alliance,, NTT Technical Journal, The Telecommunications Association of Japan, vol. 22, No. 2, Feb. 1, 2010.
Japanese Office Action for Application No. 2016163654, dated Feb. 6, 2018.

* cited by examiner

IMAGE PROCESSING DEVICE, IMAGE REPRODUCTION DEVICE, AND IMAGE REPRODUCTION SYSTEM

CROSS-REFERENCE TO RELATED APPLICATIONS

The present application is a continuation of U.S. application Ser. No. 13/308,796, filed Dec. 1, 2011, now U.S. Pat. No. 9,641,886, which claims priority to Japanese application P2010-275976, filed Dec. 10, 2010, the disclosures of which are hereby incorporated by reference herein.

BACKGROUND

The present disclosure relates to an image processing device, an image reproduction device, and an image reproduction system.

A wireless LAN (Local Area Network) system as typified by IEEE (Institute of Electrical and Electronics Engineers) 802.11 is becoming increasingly common in place of a wired network for its advantage such as high flexibility of equipment.

A wireless LAN system standardized by the IEEE 802.11 is composed of a group of wireless communication devices which are an access point operating as a master unit and a plurality of stations operating as slave units, and a plurality of stations are connected to one access point.

Further, according to Wi-Fi Direct under Wi-Fi Alliance standard development, it is proposed to form a communication group by determining which of a group owner and a client each of a plurality of wireless communication devices acts as. The group owner operates as a simplified access point and has a function to connect one or two or more clients.

As a use case of Wi-Fi Direct, a cellular phone, a PC (Personal Computer) and a display device form a communication group, and the display device displays image data transmitted from the cellular phone or the PC. Because the cellular phone, the PC, and the display device communicate without through an access point, low delay can be achieved with a rate transmission utilizing a radio performance.

Note that a technique for two wireless communication devices to dynamically set a data rate according to the conditions of a communication channel is disclosed in Japanese Unexamined Patent Application Publication no 2009-272874.

SUMMARY

In the case of compressing image data composed of a plurality of frame images and making packet transmission in Wi-Fi Direct, the data volume of each frame image can be dynamically varied depending on the radio conditions between wireless communication devices. For example, a wireless communication device at the transmitting end can accommodate a change of a transmission rate by switching the image format of each frame image such as the resolution, the frame rate, the compressibility or the scan mode (progressive, interlace etc.) during transmission of image data.

However, if the transmitting end switches the image format during transmission of image data, a case can occur where the receiving end fails to reproduce the image data normally. For example, when the transmitting end changes the resolution of a frame image, the receiving end can recognize the change of the resolution only after the frame image is decoded by a decoder, and switching of the setting of a scaler placed in the subsequent stage of the decoder is not made in time. This raises a concern that normal reproduction of the frame image immediately after the change of the resolution results in failure.

In light of the foregoing, it is desirable to provide novel and improved image processing device, image reproduction device, and image reproduction system that enable the image reproduction device to accommodate a change in the format of transmitted image data in advance.

In view of the above, the present embodiments are provided. According to an illustrative embodiment, a data transmission device is provided. The device includes a communication unit for transmitting data to a receiver and transmitting data having a changed characteristic to the receiver, wherein when transmitting the data the device transmits timing information to the receiver indicating a time that the device will begin transmitting the data having a changed characteristic.

According to the embodiments of the present disclosure, the image reproduction device can accommodate a change in the format of transmitted image data in advance.

DETAILED DESCRIPTION OF THE EMBODIMENT(S)

Figure 1:
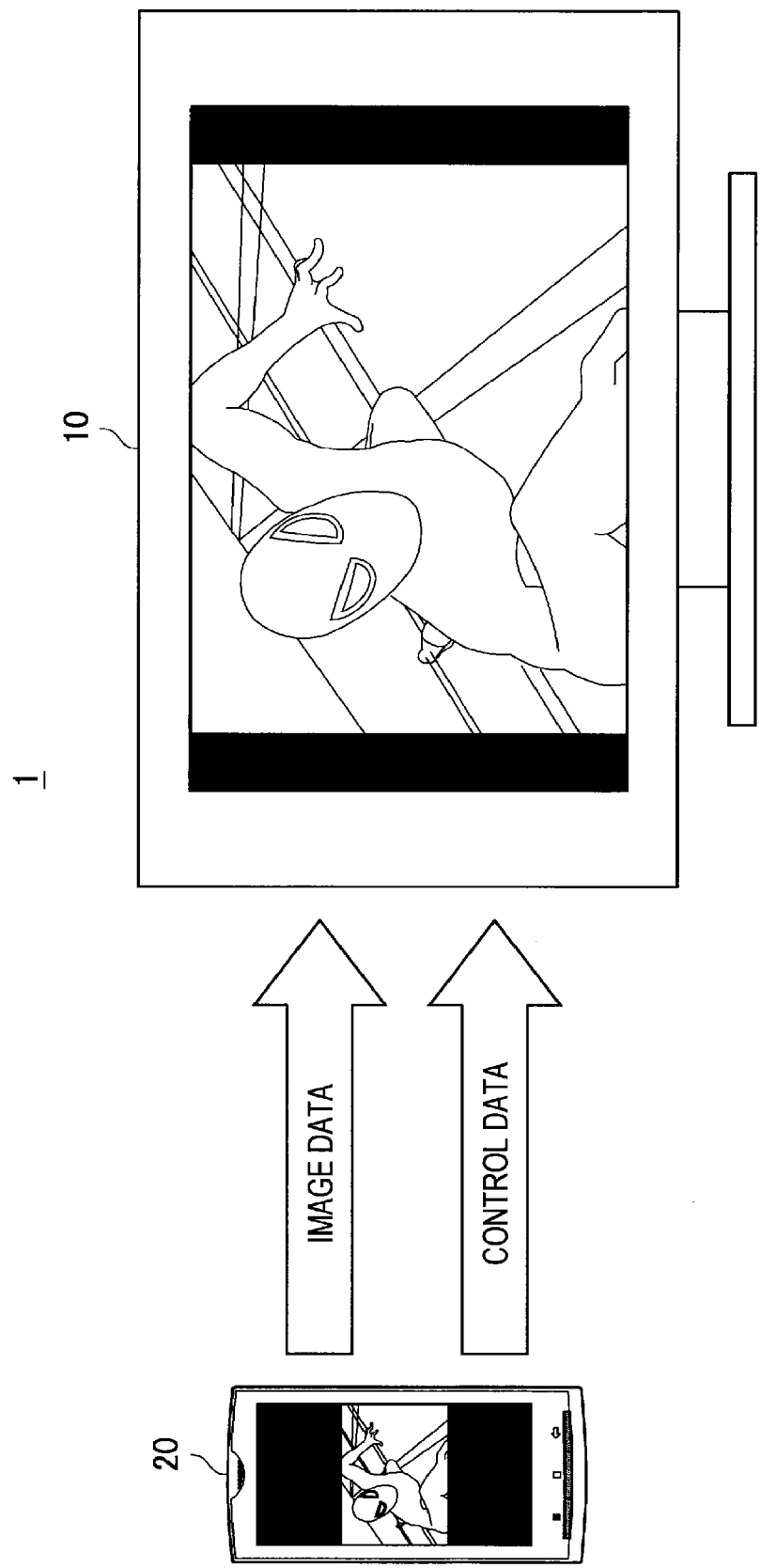
FIG. 1 is an explanatory view illustrating a configuration of an image reproduction system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. However, when there is no particular need to distinguish between a plurality of structural elements having the same function, they are denoted by the same reference numeral.

Further, "DETAILED DESCRIPTION OF THE EMBODIMENT" will be described in the following order.
1. Overview of Image Reproduction System
2. Hardware Configuration
3. Functions of Cellular Phone and Display Device
4. Operation of Image Reproduction System
5. Summary <1. Overview of Image Reproduction System>

FIG. 1 is an explanatory view illustrating a configuration of an image reproduction system 1 according to an embodiment of the present disclosure. Referring to FIG. 1, the image reproduction system 1 according to the embodiment of the present disclosure includes a cellular phone 20 and a display device 10.

The cellular phone 20 has a function of connecting and wirelessly communicating with a nearby wireless communication device such as the display device 10. For example, the cellular phone 20 can form a communication group with the display device 10 according to Wi-Fi Direct under Wi-Fi Alliance standard development and wirelessly communicate with the display device 10 in the communication group without through an access point.

Further, the cellular phone 20, forming the communication group with the display device 10, can transmit content data, control data and the like to the display device 10. In this specification, an embodiment in which image data composed of a plurality of frame images is transmitted as an example of the content data is mainly described. The image data may be data such as movie, television program or video program, a user's work screen in the cellular phone 20, or a display screen of a game. The content data, however, is not limited to the image data, and audio data such as music, lecture, or radio program may be transmitted as the content data from the cellular phone 20.

A layer in which the image data and the control data are communicated is described hereinafter with reference to FIG. 2.

Figure 2:
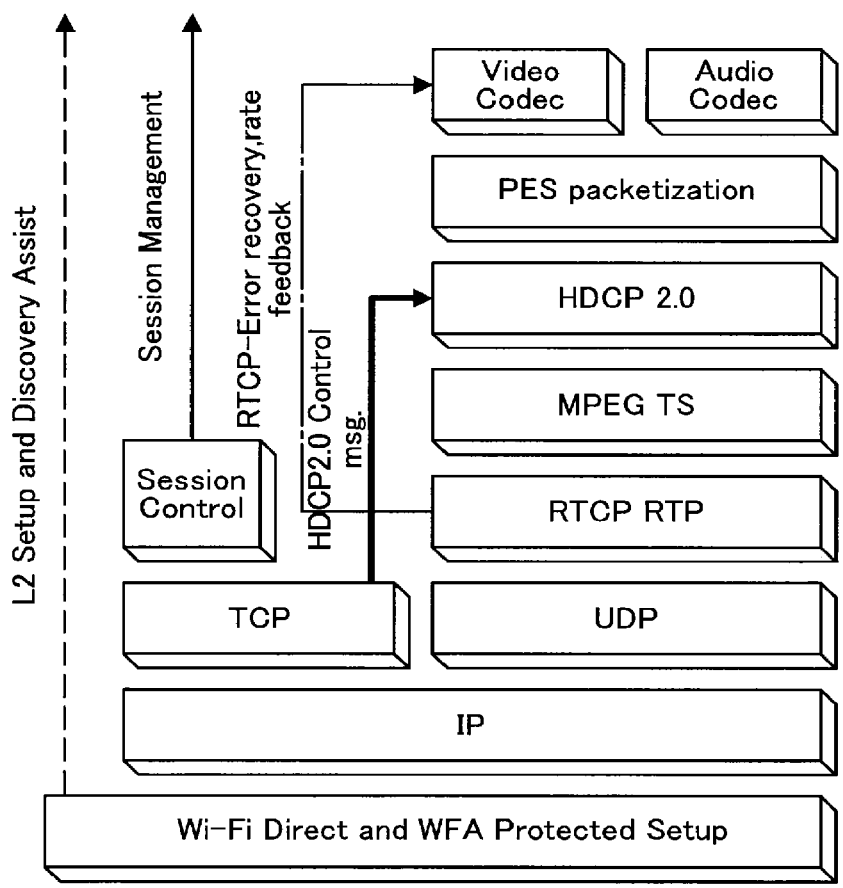
FIG. 2 is an explanatory view illustrating a software concept of a cellular phone.

FIG. 2 is an explanatory view illustrating a software concept of the cellular phone 20. Referring to FIG. 2, the content data such as the image data is transmitted using MPEG-TS/RTP/UDP/IP and the like. On the other hand, the control data is transmitted through a communication path different from that of the image data, such as TCP/IP or L2 layer.

Note that FIG. 1 shows the cellular phone 20 as an example of the image processing device, and the image processing device is not limited to the cellular phone 20. For example, the image processing device may be an information processing device such as a PC (Personal Computer), a home video processing device (e.g. a DVD recorder, a videocassette recorder etc.), a PDA (Personal Digital Assistants), a home game machine, a portable video processing device, a portable game machine or an electrical household appliance.

The display device 10 has a function of connecting and wirelessly communicating with a nearby wireless communication device such as the cellular phone 20. For example, the display device 10 can form a communication group with the cellular phone 20 according to Wi-Fi Direct under Wi-Fi Alliance standard development and wirelessly communicate with the cellular phone 20 in the communication group without through an access point. Note that the display device 10 and the cellular phone 20 may perform direct communication using IEEE802.11z (TDLS), for example, even when they are connected to the same access point (AP).

Further, the display device 10, forming the communication group with the cellular phone 20, can receive the image data transmitted form the cellular phone 20 and display the received image data. In this configuration, a user can display the image data processed in the cellular phone 20 on the display device 10 with a larger screen without complicated work.

Note that FIG. 1 shows the display device 10 as an example of the image reproduction device, and the image reproduction device is not limited to the display device 10. For example, the image reproduction device may be any information processing device having an image reproduction function, such as a PC or a video processing device.

Further, although an example in which a wireless communication function is implemented in the cellular phone 20 and the display device 10 is illustrated in FIG. 1, the embodiment is not limited to such an example. For example, an adapter having a wireless communication function, an image data encoding function and a packetization function may be externally attached to the cellular phone 20. Likewise, an adapter having a wireless communication function, an image data decoding function and the like may be externally attached to the display device 10.

As described above, because the cellular phone 20 and the display device 10 perform wireless communication directly without through an access point according to the embodiment, low delay can be achieved with a rate transmission utilizing a radio performance. Further, by use of slice transmission described hereinbelow, still lower delay can be achieved.

The slice transmission is a method that transmits data by dividing each frame image into a plurality of slices. The slice transmission has an advantage that the receiving end can start reproduction of each slice without waiting for receiving all frame images.

Figure 3:
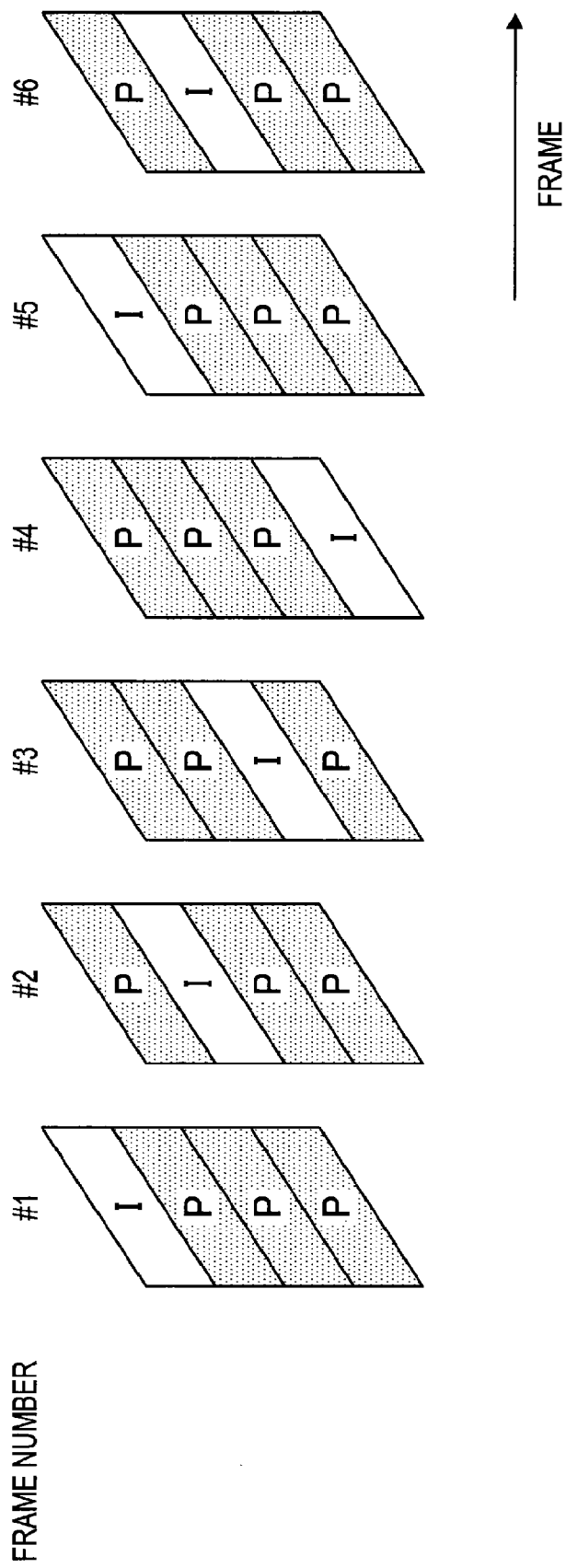
FIG. 3 is an explanatory view illustrating a specific example of each frame image transmitted by slice transmission.

FIG. 3 is an explanatory view illustrating a specific example of each frame image transmitted by the slice transmission. Referring to FIG. 3, each frame image transmitted by the slice transmission is divided into a plurality of slices, and each slice is I-slice or P-slice compressed by AVC. Further, the transmitting end makes the slice position of I-slice vary from frame image to frame image. In the example shown in FIG. 3, the highest slice is I-slice in the frame image #1, and the second highest slice is I-picture in the frame image #2.

In this manner, because the slice transmission allows I-slice and P-slice to coexist in one frame image, a rate can be stabilized, and a buffer length to be used can be reduced, thereby achieving low delay.

<2. Hardware Configuration>

The overview of the image reproduction system 1 according to the embodiment of the disclosure is described above. Hereinafter, the hardware configuration of the cellular phone 20 according to the embodiment of the disclosure is described hereinafter with reference to FIG. 4.

Figure 4:
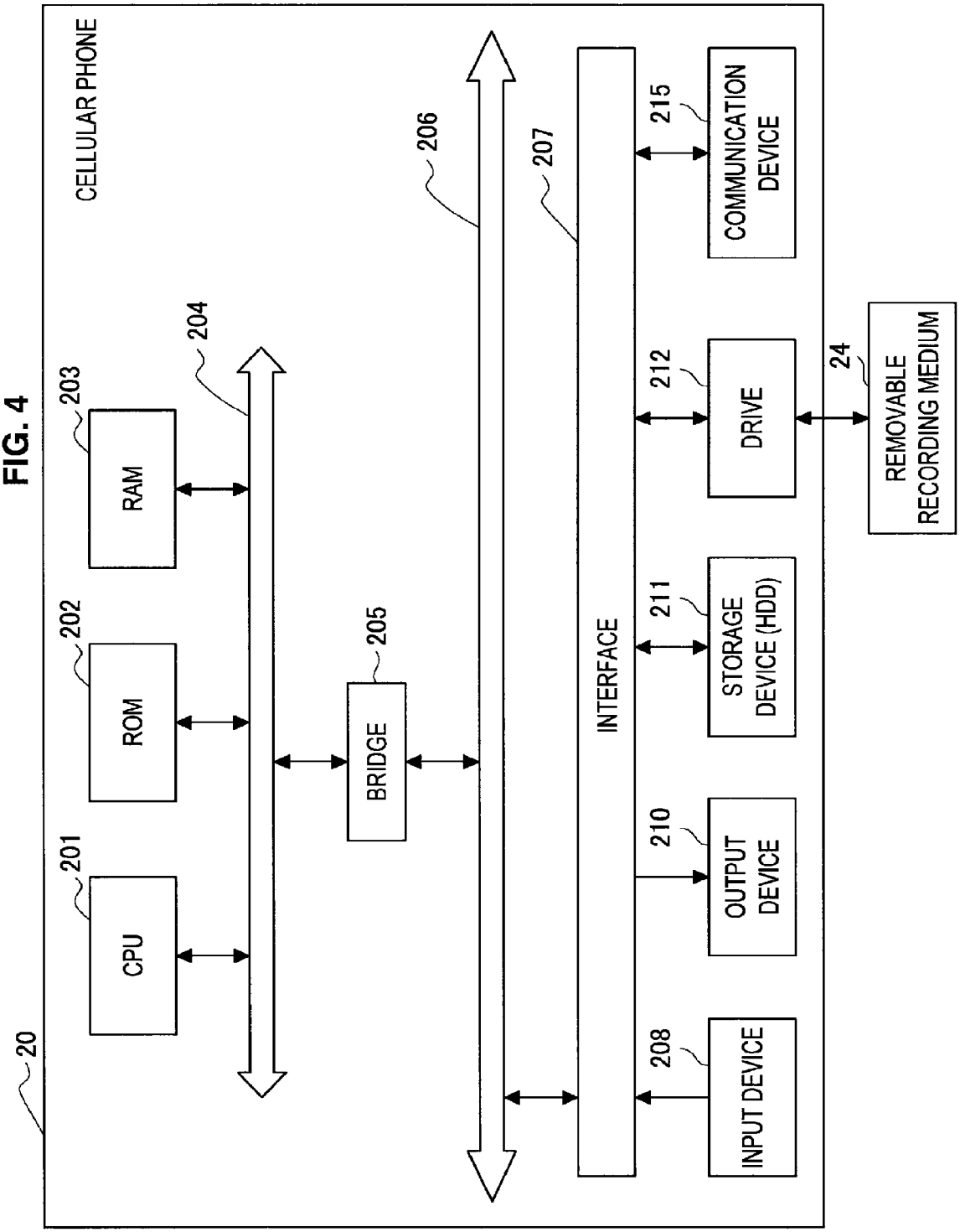
FIG. 4 is an explanatory view illustrating a hardware configuration of a cellular phone according to an embodiment of the present disclosure.

FIG. 4 is an explanatory view illustrating a hardware configuration of the cellular phone 20 according to the embodiment of the disclosure. The cellular phone 20 includes a CPU (Central Processing Unit) 201, a ROM (Read Only Memory) 202, a RAM (Random Access Memory) 203, and a host bus 204. The cellular phone 20 further includes a bridge 205, an external bus 206, an interface 207, an input device 208, an output device 210, a storage device (HDD) 211, a drive 212, and a communication device 215.

The CPU 201 functions as a processing device and a control device, and it controls the overall operation in the cellular phone 20 according to programs. The CPU 201 may be a microprocessor. The ROM 202 stores programs to be used by the CPU 201, processing parameters and so on. The RAM 203 temporarily stores programs to be used in the execution of the CPU 201, parameters that vary in the execution and so on. The CPU 201, the ROM 202 and the RAM 203 are connected to one another through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from one another, and their functions may be implemented by one bus.

The input device 208 may include an input means for a user to input information, such as a mouse, a keyboard, a touch panel, a button, a microphone, a switch or a lever, and an input control circuit for generating an input signal based on a user input and outputting it to the CPU 201, for example. A user of the cellular phone 20 manipulates the input device 208 to thereby input various kinds of data or instruct processing operations to the cellular phone 20.

The output device 210 may include a display device such as a CRT (Cathode Ray Tube) display device, an LCD (Liquid Crystal Display) device, an OLED (Organic Light Emitting Display) device or a lamp, for example. Further, the output device 210 may include an audio output device such as a speaker or a headphone, for example. The output device 210 outputs reproduced contents, for example. Specifically, the display device displays various kinds of information such as reproduced video data by texts or images. On the other hand, the audio output device converts reproduced audio data or the like into sound and outputs the sound.

The storage device 211 is a device for data storage that is configured as an example of a storage unit of the cellular phone 20 according to the embodiment. The storage device 211 may include a storage medium, a recording device to record data into the storage medium, a reading device to read data from the storage medium, a deleting device to delete data recorded in the storage medium or the like. The storage device 211 may be an HDD (Hard Disk Drive), for example. The storage unit 211 drives a hard disk and stores programs to be executed by the CPU 201 and various data.

The drive 212 is a reader/writer for storage medium, and it may be incorporated into the cellular phone 20 or attached thereto externally. The drive 212 reads information recorded in a removable storage medium 24 such as a magnetic disk, an optical disk, a magneto-optical disk or a semiconductor memory which is attached thereto and outputs the information to the RAM 203. Further, the drive 212 can write information to the removable storage medium 24.

The communication device 215 is a communication interface configured by a communication device or the like to establish a connection with a nearby wireless communication device or a network, for example. The communication device 215 may be a communication device compatible with a wireless LAN (Local Area Network), a communication device compatible with LTE (Long Term Evolution), or a wire communication device that performs wired communication.

Note that although the hardware configuration of the cellular phone 20 is described above with reference to FIG. 4, the hardware of the display device 10 may be configured in substantially the same manner as that of the cellular phone 20, and an explanation thereof is omitted.

<3. Functions of Cellular Phone and Display Device>

The hardware configurations of the cellular phone 20 and the display device 10 are described above with reference to FIG. 4. Hereinafter, the functions of the cellular phone 20 and the display device 10 are described with reference to FIGS. 5 to 10.

Figure 5:
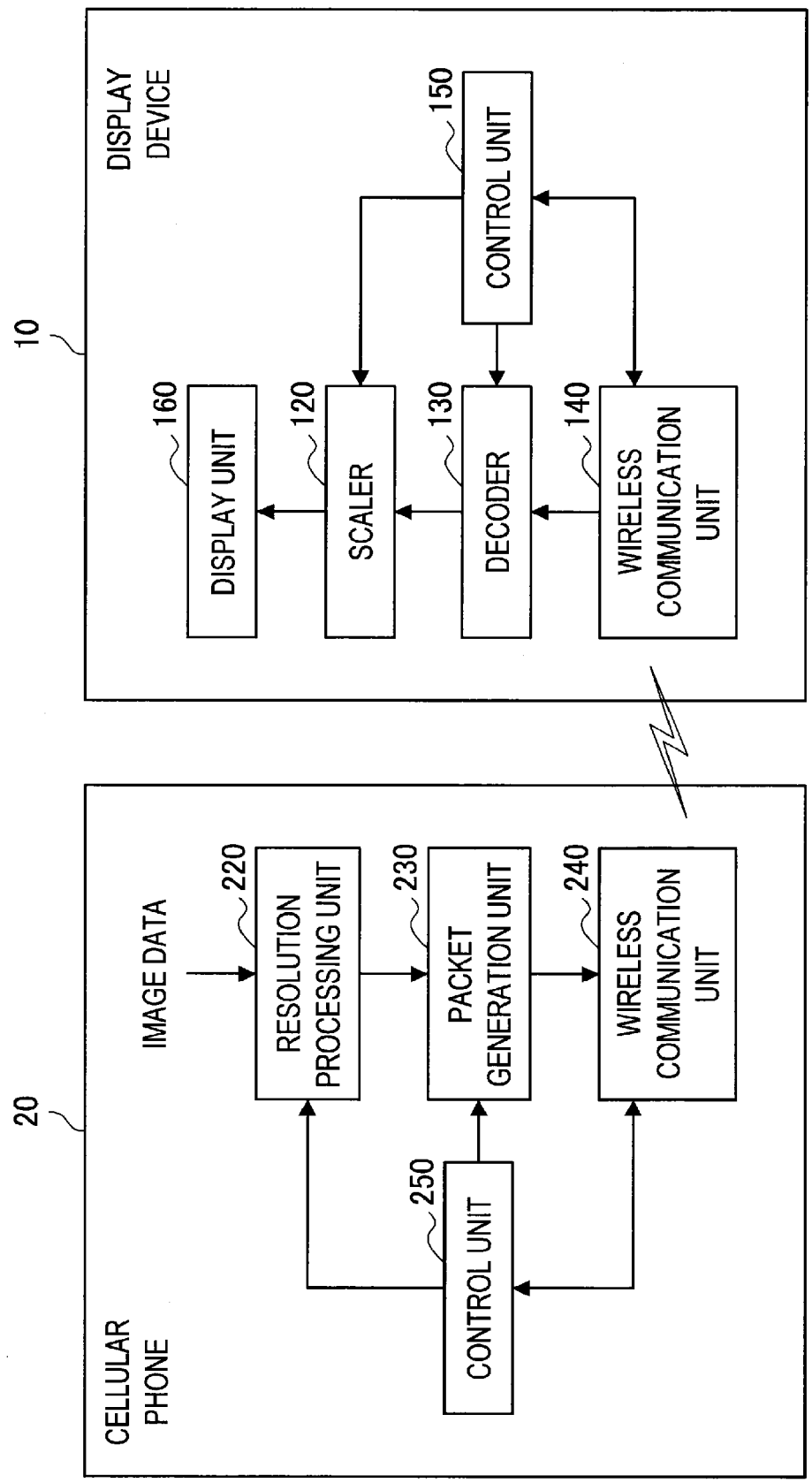
FIG. 5 is a functional block diagram illustrating configurations of a cellular phone and a display device.

FIG. 5 is a functional block diagram showing the configurations of the cellular phone 20 and the display device 10. Referring to FIG. 5, the display device 10 includes a scaler 120, a scaler 120, a wireless communication unit 140, a control unit 150, and a display unit 160. The cellular phone 20 includes a resolution processing unit 220, a packet generation unit 230, a wireless communication unit 240, and a control unit 250.

The resolution processing unit 220 of the cellular phone 20 performs processing for changing the resolution of supplied image data according to control by the control unit 250. For example, when image data with a resolution of 1920×1080 is supplied, if output of image data with a resolution of 1280×720 is designated by the control unit 250, the resolution processing unit 220 converts the resolution of the supplied image data from 1920×1080 to 1280×720. The resolution processing unit 220, together with the packet generation unit 230, serves as an image processing unit that processes image data.

Note that, although not shown in FIG. 5, the cellular phone 20 may include an image processing unit such as a frame rate change unit that changes the frame rate of the supplied image data or a scan mode change unit that changes the scan mode (progressive, interlace etc.) of the image data.

The packet generation unit 230 generates packets for wireless transmission from the image data and the like supplied from the resolution processing unit 220. Hereinafter, the detailed configuration of the packet generation unit 230 is described with reference to FIGS. 6 and 7.

Figure 6:
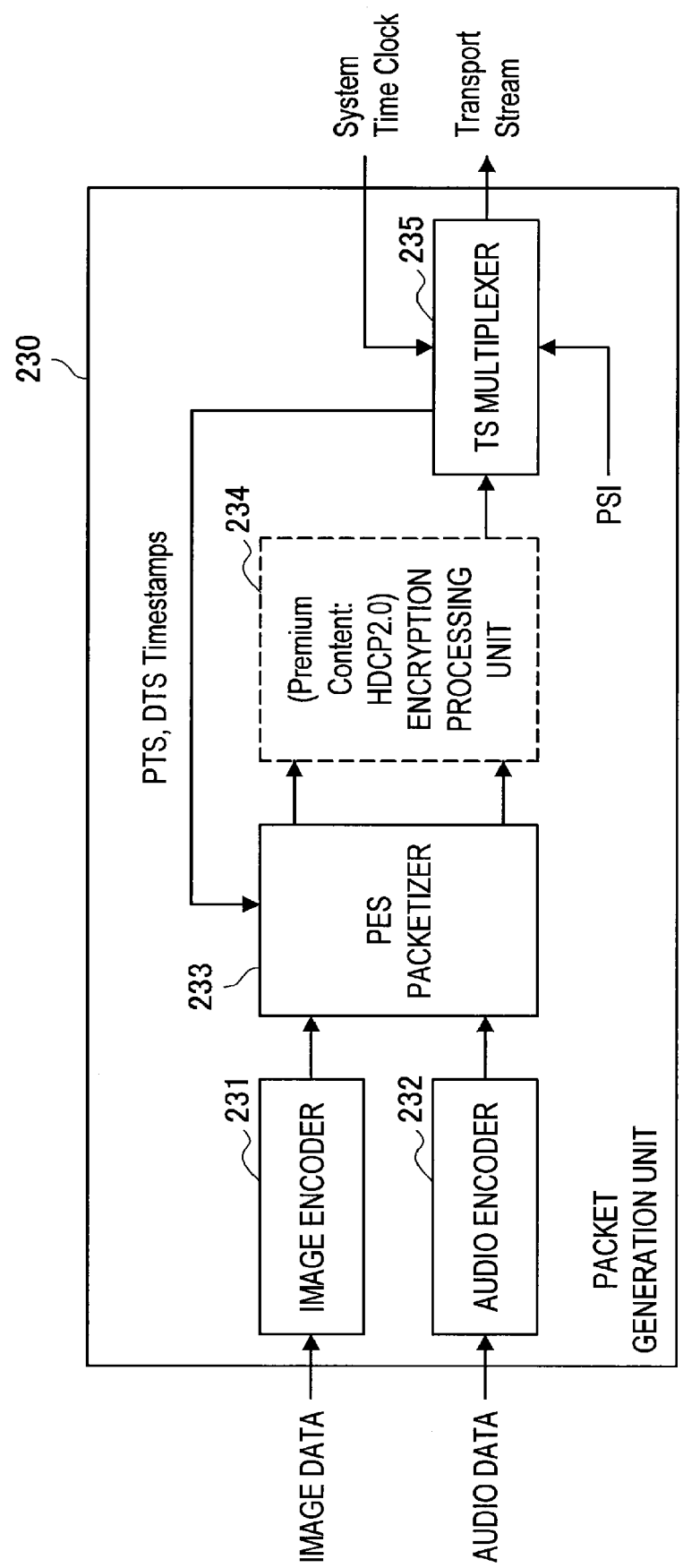
FIG. 6 is an explanatory view illustrating a configuration of a packet generation unit.

FIG. 6 is an explanatory view illustrating a configuration of the packet generation unit 230. Referring to FIG. 6, the packet generation unit 230 includes an image encoder 231, an audio encoder 232, a PES packetizer 233, an encryption processing unit 234, and a TS multiplexer 235.

The image encoder 231 performs compression encoding of supplied image data and outputs the image data. Likewise, the audio encoder 232 performs compression encoding of supplied audio data and outputs the audio data. Note that the image encoder 231 and the audio encoder 232 can change the compressibility of each data according to an instruction from the control unit 250.

The PES packetizer 233 generates PES packets from the image data output from the image encoder 231 and the audio data output from the audio encoder 232. To be more specific, the PES packetizer 233 generates a PES packet composed of PES header and PES payload as shown in (1) of FIG. 7. The PES header includes a field for describing timing information such as DTS (Decoding Time Stamp) or PTS (Presentation Time Stamp).

The encryption processing unit 234 encrypts the PES packet supplied from the PES packetizer 233 and outputs the packet. The encryption processing unit 234 may encrypt the PES packet by HDCP (High-bandwidth Digital Content Protection) system 2.0, for example.

Figure 7:
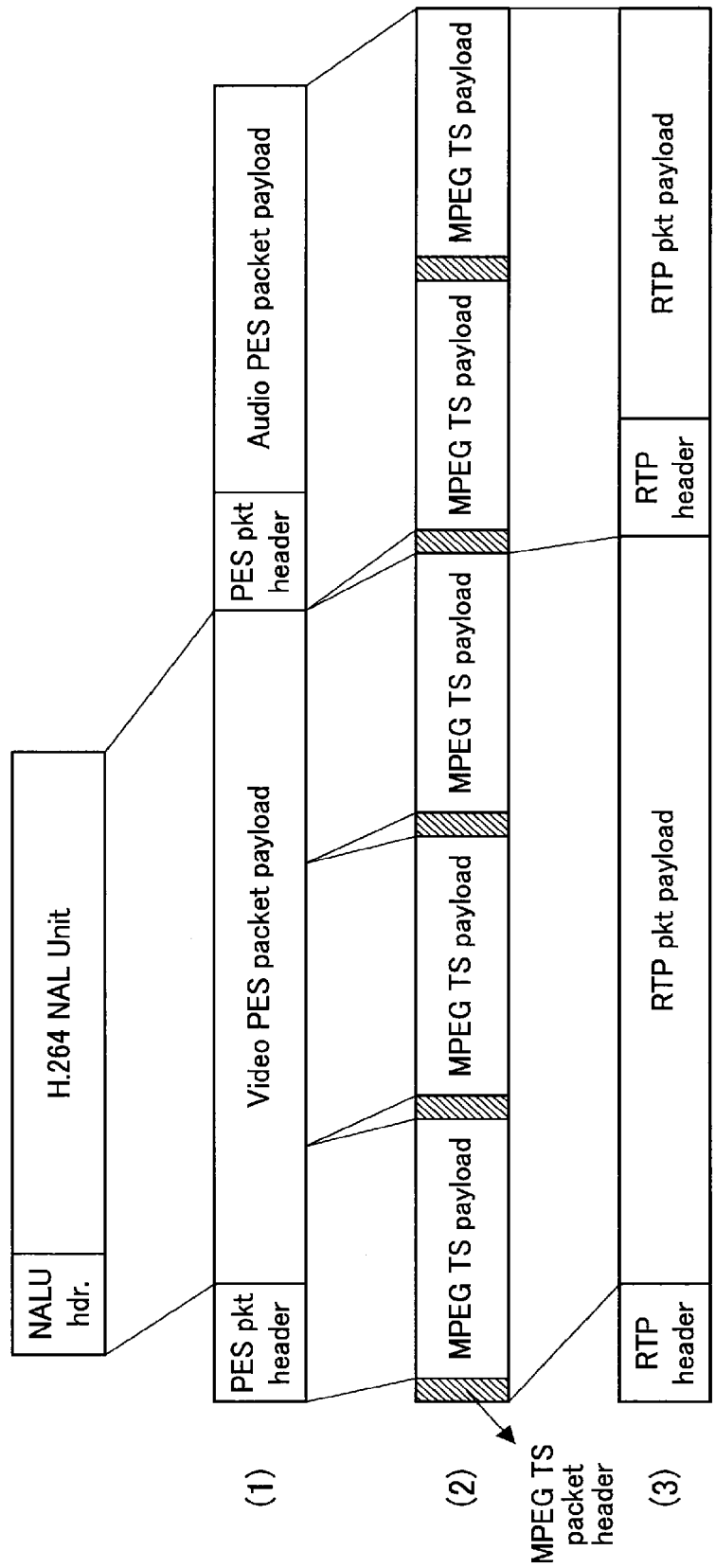
FIG. 7 is an explanatory view illustrating a packet structure.

The TS multiplexer 235 generates a TS stream composed of TS header and TS payload as shown in (2) of FIG. 7. Note that the TS payload is obtained by dividing the PES packet into 188-byte fixed lengths, for example. The TS stream is transmitted as an RTP packet in which RTP header is added as shown in (3) of FIG. 7.

The wireless communication unit 240 wirelessly transmits the RTP packet containing the image data generated by the packet generation unit 230, the control data designated by the control unit 250 and the like. Note that the control data contains timing information indicating timing of changing the resolution of the image data, as described in detail later. The wireless communication unit 240 may operate according to Wi-Fi Direct under Wi-Fi Alliance standard development, for example.

The control unit 250 controls the overall operation of the cellular phone 20. For example, the control unit 250 controls the detail of processing of the resolution processing unit 220 and the packet generation unit 230. To be more specific, when a transmission rate changes depending on the radio conditions, the control unit 250 gives an instruction to change the resolution of the image data to the resolution processing unit 220 and gives an instruction to change the compressibility of the image data to the image encoder 231 of the packet generation unit 230 in order to accommodate the change of the transmission rate. Further, the control unit 250 may give an instruction to change the frame rate or give an instruction to change the scan mode (progressive, interlace etc.) in order to accommodate the change of the transmission rate.

Figure 8:
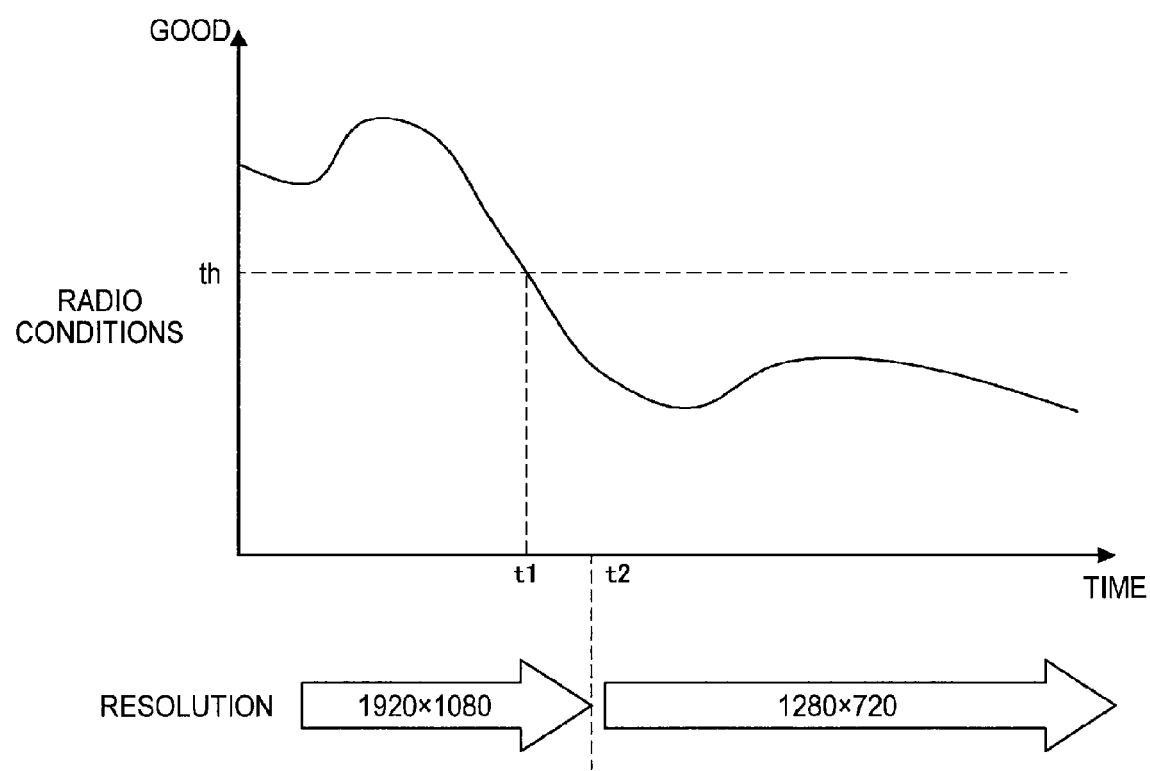
FIG. 8 is an explanatory view illustrating a relation of a change in radio conditions and switching of a resolution.

FIG. 8 is an explanatory view illustrating a relation of a change in radio conditions and switching of a resolution. Referring to FIG. 8, when an evaluated value of the radio conditions falls below a threshold th during transmission of image data with a resolution of 1920×1080, the control unit 250 gives an instruction to change the resolution of the image data into 1280×720 to the resolution processing unit 220. The image data with a resolution of 1280×720 is thereby transmitted from time t2.

Note that the control unit 250 can detect the radio conditions by various methods. For example, the control unit 250 may detect the radio conditions according to the frequency of a request for retransmission from the display device 10, may detect the radio conditions according to RSSI of a radio signal received from the display device 10, or may detect the radio conditions based on measurement information from the display device 10.

Further, the control unit 250 may switch the detail of processing of the resolution processing unit 220 and the packet generation unit 230 in the case where the type of the image data to be transmitted has changed, not limited to the case where the radio conditions have changed. For example, when the image data to be transmitted has changed from image data which is like a still image such as a Web page and for which a high resolution is necessary to image data such as a moving image for which a high frame rate, rather than a high resolution, is necessary, the control unit 250 gives an instruction to reduce the resolution to the resolution processing unit 220.

Further, when it is decided to switch the detail of processing of the image data such as the resolution, the control unit 250 controls the wireless communication unit 240 to supply timing information indicating timing of switching to the display device 10, and gives an instruction to switch the detail of processing of the image data at the timing. Note that the timing information may be time information indicating DTS or PTS contained in the PES header. The significance and the advantage of supplying the timing information in advance to the display device 10 are described later with reference to FIGS. 9 and 10.

The wireless communication unit 140 (receiving unit) of the display device 10 receives the RTP packet containing the image data, the control data containing the timing information and the like from the cellular phone 20. The wireless communication unit 140 may operate according to Wi-Fi Direct under Wi-Fi Alliance standard development, for example.

The decoder 130 interprets the RTP packet received by the wireless communication unit 140 and decodes the image data and the like contained in the RTP packet. The scaler 120 adjusts the resolution of the image data supplied from the decoder 130 to conform to the resolution of the display unit 160. The decoder 130 and the scaler 120 serve as a reproduction unit that reproduces the image data.

The display unit 160 displays the image data reproduced by the decoder 130 and the scaler 120.

The control unit 150 controls the overall operation of the display device 10. For example, the control unit 150 controls the detail of reproduction processing by the decoder 130 and the scaler 120 according to the timing information supplied from the cellular phone 20. To be more specific, when the control unit 150 receives the timing information indicating the timing when the resolution is to be switched from the cellular phone 20, the control unit 150 modifies the setting of the scaler 120 at the timing indicated by the timing information. In this configuration, the display device 10 allows reproduction of the frame image immediately after the change of the resolution to result in success. This is described more specifically with reference to FIGS. 9 and 10.

Figure 9:
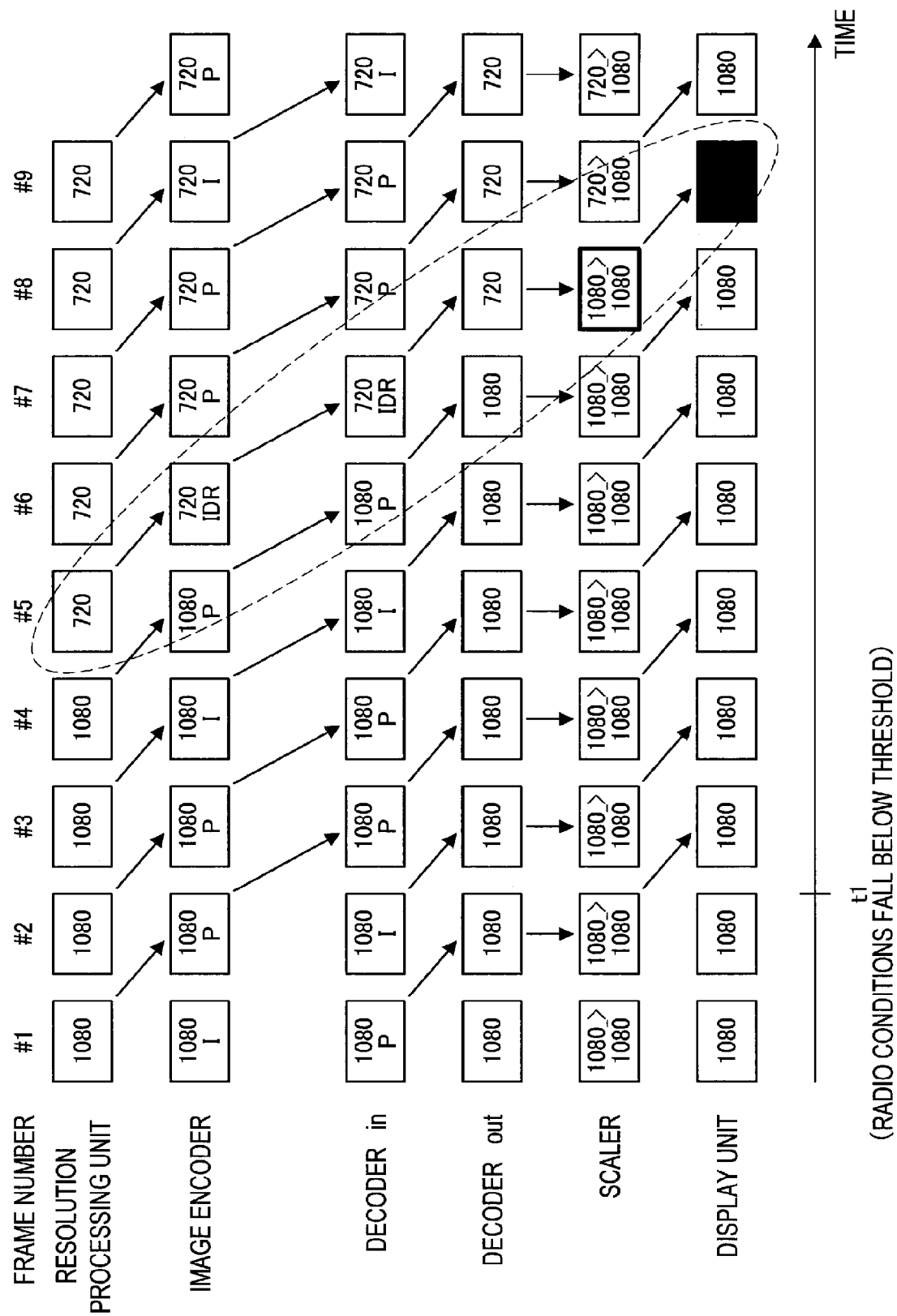
FIG. 9 is an explanatory view illustrating a process flow according to a comparative example.

FIG. 9 is an explanatory view illustrating a process flow according to a comparative example. The transmitting end according to the comparative example switches the resolution from 1080 (only the vertical resolution is shown; the same applies below) to 720 in the frame image #5 without advance notice to the receiving end. In this case, although it is necessary for the scaler at the receiving end to adjust the resolution of the frame images after the frame image #5 from 720 to 1080, because the switching of the resolution is unrecognizable until the image data is decoded by the decoder, a modification of setting of the scaler is not made in time. As a result, reproduction of the image data is failed, and it is difficult to achieve seamless switching in the comparative example.

Particularly, when the slice transmission is used, it is difficult to make a modification of setting of the scaler in time. Further, in the comparative example where the timing of switching the resolution is not predictable at the receiving end, it is also difficult to perform conceal processing that transforms the previous slice to have a new resolution in a slice at a seam and displays the transformed slice in an unreceived slice portion.

Figure 10:
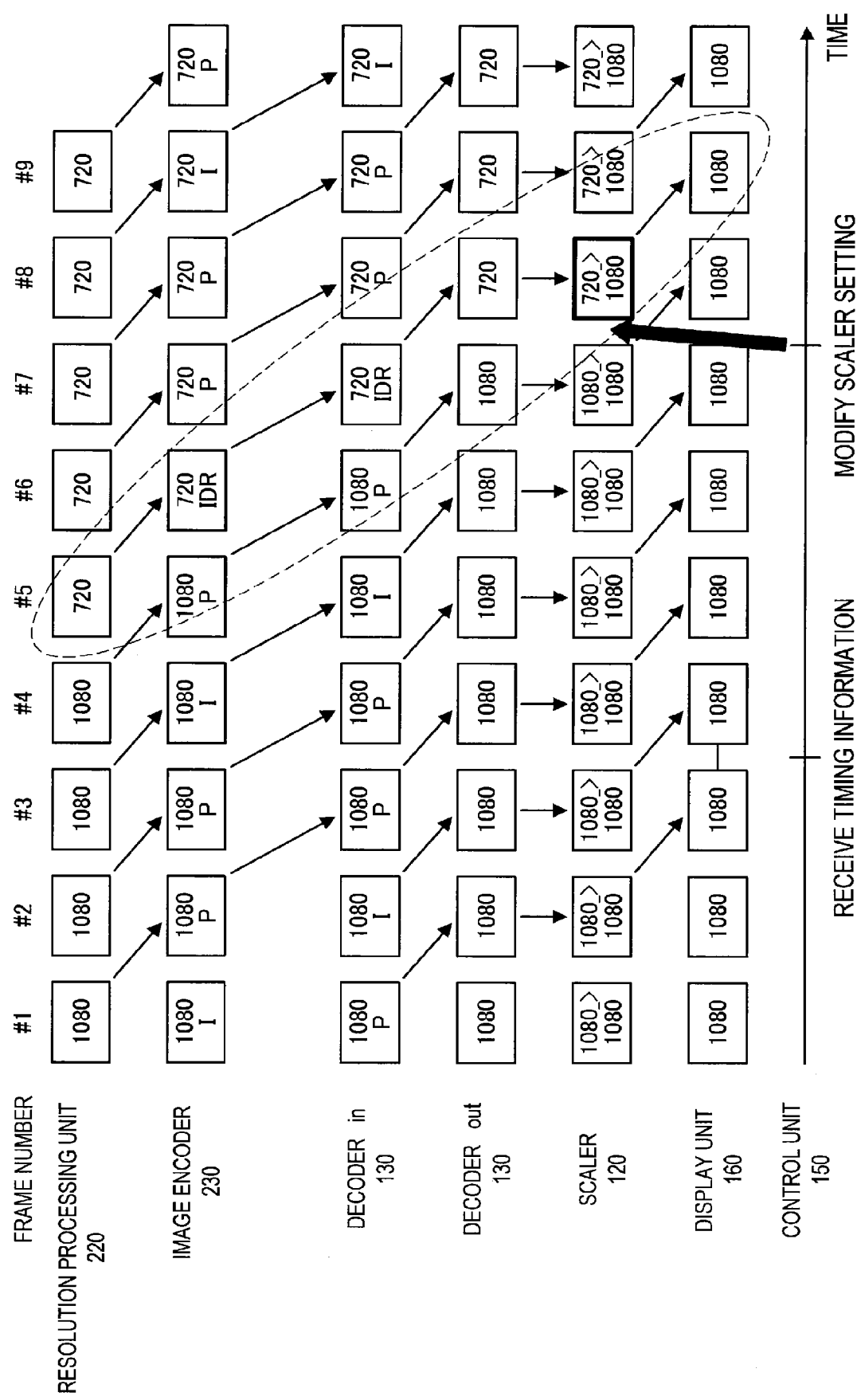
FIG. 10 is an explanatory view illustrating a process flow according to the embodiment.

FIG. 10 is an explanatory view illustrating a process flow according to the embodiment. The cellular phone 20 according to the embodiment transmits the timing information indicating the timing of switching the detail of processing such as the resolution in advance to the display device 10 as described earlier. Therefore, the display device 10 can recognize that the resolution will be switched from 1080 to 720 from the frame image #5 based on the received timing information as shown in FIG. 10.

The control unit 150 of the display device 10 can thereby modify the setting of the scaler 120 in time for the adjustment timing of the frame image #5 indicated by the timing information. As a result, the frame image #5 can be reproduced normally, thereby achieving seamless switching. Further, when the slice transmission is used, it is possible to perform conceal processing that transforms the previous slice to have a new resolution in a slice at a seam and displays the transformed slice in an unreceived slice portion.

<4. Operation of Image Reproduction System>

The functions of the cellular phone 20 and the display device 10 are described above. Hereinafter, the operation of the image reproduction system 1 composed of the cellular phone 20 and the display device 10 is described with reference to FIG. 11.

Figure 11:
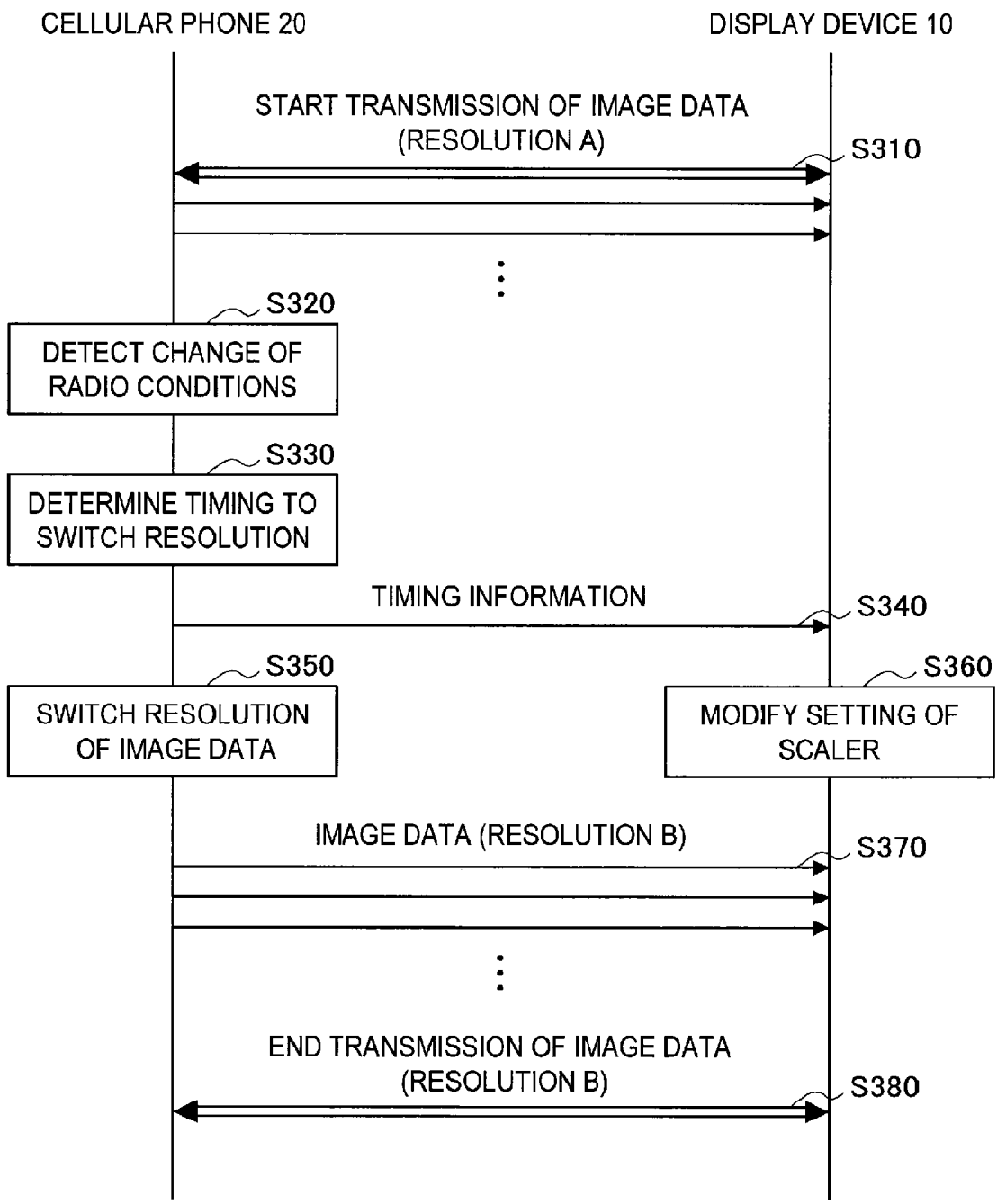
FIG. 11 is a sequence chart illustrating an operation of an image reproduction system.

FIG. 11 is a sequence chart showing the operation of the image reproduction system 1. First, when the cellular phone 20 starts transmission of image data (S310), the display device 10 starts reproduction of the image data. It is assumed the resolution of the image data transmitted from the cellular phone 20 is a resolution A.

After that, when the control unit 250 of the cellular phone 20 detects a change in radio conditions (improvement or deterioration) (S320), the control unit 250 determines timing of changing the resolution of the image data (S330) and transmits the timing information indicating the timing to the display device 10 (S340).

Then, the control unit 250 of the cellular phone 20 gives an instruction for switching from the resolution A to the resolution B to the resolution processing unit 220 at the timing indicated by the timing information (S350). Further, the display device 10 modifies the setting of the scaler to conform to the resolution B at the timing indicated by the timing information (S360).

Then, the cellular phone 20 starts transmission of image data with the resolution B (S370), and, because the display device 10 has modified the setting of the scaler in advance, seamless reproduction at the switching of the resolution can be achieved. After that, the transmission of the image data ends (S380).

<5. Summary>

As described above, the cellular phone 20 according to the embodiment of the present disclosure transmits the timing information indicating the timing of switching the detail of processing such as the resolution in advance to the display device 10. Therefore, the display device 10 can modify the setting of the scaler 120 in time for the timing indicated by the timing information. As a result, the frame image immediately after the switching of the resolution can be reproduced normally, thereby achieving seamless switching. Further, when the slice transmission is used, it is possible to perform conceal processing that transforms the previous slice to have a new resolution in a slice at a seam and displays the transformed slice in an unreceived slice portion.

Although a preferred embodiment of the present disclosure is described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, although an example in which the cellular phone 20 transmits the timing information in the case of switching the resolution is described above, the present disclosure is not limited to such an example. As an alternative example, the cellular phone 20 may supply the timing information and the information after switching in advance to the display device 10 in the case of switching the image format such as the frame rate, the compressibility, or the scan mode (progressive, interlace etc.).

Further, it is not always necessary to perform the steps in the processing of the image reproduction system 1 in this specification in chronological order according to the sequence shown in the sequence chart. For example, the steps in the processing of the image reproduction system 1 may be executed in a different sequence from the sequence shown in the sequence chart or executed in parallel.

Furthermore, it is possible to create a computer program that causes hardware such the CPU 201, the ROM 202 and the RAM 203 included in the display device 10 and the cellular phone 20 to perform the functions equal to the elements of the display device 10 and the cellular phone 20 described above. Further, a storage medium that stores such a computer program may be provided.

The present disclosure contains subject matter related to that disclosed in Japanese Priority Patent Application JP 2010-275976 filed in the Japan Patent Office on Dec. 10, 2010, the entire content of which is hereby incorporated by reference.

The invention claimed is:

1. A wireless communication device usable in a wireless local area network (LAN), the wireless communication device comprising:
   circuitry configured to:
      control processing of a video program for transmission to another wireless communication device via a UDP (User Datagram Protocol) protocol established as a first direct communication protocol between the wireless communication device and the another wireless communication device,
      change a format of the video program, the video program including a plurality of frames,
      transmit time information to the another wireless communication device via a TCP (Transmission Control Protocol) protocol established as a second direct communication protocol between the wireless communication device and the another wireless communication device, the time information indicating a Presentation Time Stamp (PTS) and a Decode Time Stamp (DTS) of a frame of the video program whereat the format is to be changed, and
      transmit the video program, in which the format has been changed starting at the frame of the video program whereat the format is to be changed, to the another wireless communication device after transmitting the time information.

2. The wireless communication device of claim 1, wherein the circuitry determines the format of the video program in accordance with an image data type.

3. The wireless communication device of claim 2, wherein the image data type comprises one of a still image or a moving image.

4. The wireless communication device of claim 1, wherein the circuitry configured to transmit the time information and to transmit the video program comprises a wireless transmitter.

5. The wireless communication device of claim 1, wherein the circuitry configured to control processing of the video program for transmission comprises a processor that generates one or more instructions to control processing.

6. The wireless communication device of claim 1, wherein the circuitry configured to change the format of the video program comprises an image encoder.

7. The wireless communication device of claim 6, wherein the image encoder is coupled to a packetizer that generates one or more packets having the Presentation Time Stamp (PTS) and the Decode Time Stamp (DTS) information of the frame of the video program whereat the format is to be changed.

8. The wireless communication device of claim 7, wherein the wireless communication device comprises a cellular phone.

9. The wireless communication device of claim 1, wherein the wireless communication device is configured to form a communication group with the another wireless communication device according to Wi-Fi Direct.

10. The wireless communication device of claim 1, wherein a change in the format of the video program is determined based on radio conditions.

11. The wireless communication device of claim 10, wherein the change in the format of the video program comprises a change in image data resolution.

12. The wireless communication device of claim 10, wherein the change in the format of the video program comprises a change in image data type.

13. The wireless communication device of claim 10, wherein the determination based on radio conditions comprise comparing detected radio conditions to a threshold.

14. A wireless sink device usable in a wireless local area network (LAN), the wireless sink device comprising:
  circuitry configured to:
    reproduce video data with a first resolution and a second resolution, said video data representing a plurality of frames, each frame of the plurality of frames having a respective image associated therewith, the video data received from a wireless source device via a UDP (User Datagram Protocol) protocol established as a first communication protocol between the wireless sink device and the wireless source device; and
    receive time information from the wireless source device via a TCP (Transmission Control Protocol) protocol established as a second communication protocol established between the wireless source device and the wireless sink devices, the time information indicating a Presentation Time Stamp (PTS) and a Decode Time Stamp (DTS) of a frame whereat the first resolution is to be changed, and
    reproduce the video data with the second resolution changed from the first resolution after receiving the time information from the wireless source device.

15. The wireless sink device of claim 14, wherein the circuitry configured to reproduce video data comprises a processor controllably coupled to a decoder and a scaler.

16. The wireless sink device of claim 15, wherein the processor controls reproduction of the video data at a given resolution based on the received time information.

17. The wireless sink device of claim 16, wherein the processor is configured to control reproduction by modifying a resolution setting of the scaler at the received time information.

18. A wireless communication device usable in a wireless local area network (LAN), the wireless communication device comprising:
  a processor configured to control processing of a video program for transmission to another wireless communication device via a UDP (User Datagram Protocol) protocol established as a first direct communication protocol between the wireless communication device and the another wireless communication device, the processor being coupled to:
    an encoder configured to change a format of the video program, the video program including a plurality of frames, and
    a transmitter configured to transmit time information to the another wireless communication device via a TCP (Transmission Control Protocol) protocol established as a second direct communication protocol between the wireless communication device and the another wireless communication device, the time information indicating a Presentation Time Stamp (PTS) and a Decode Time Stamp (DTS) of a given frame of the video program whereat the format is to be changed, and transmit the video program, in which the format has been changed starting at the given frame, to the another wireless communication device after transmitting the time information.

19. The wireless communication device of claim 18, wherein the processor determines the format in accordance with an image data type.

20. The wireless communication device of claim 19, wherein the image data type comprises one of a still image or a moving image.

* * * * *